United States Patent [19]

Cheeseboro

[11] 4,121,836
[45] Oct. 24, 1978

[54] STYLUS CARTRIDGE SUSPENSION FOR RECORD PLAYERS

[76] Inventor: Robert G. Cheeseboro, 3650 Somerset Dr., Los Angeles, Calif. 90016

[21] Appl. No.: 778,027

[22] Filed: Mar. 16, 1977

[51] Int. Cl.² ............................................. G11B 3/10
[52] U.S. Cl. .............................. 274/23 A; 274/23 R; 274/37; 360/104
[58] Field of Search .................. 274/23 R, 23 A, 37, 274/13 R, 9; 360/104

[56] References Cited

U.S. PATENT DOCUMENTS

| | | | |
|---|---|---|---|
| 2,517,423 | 8/1950 | Gillmor | 274/23 A |
| 3,273,897 | 9/1966 | Farrington et al. | 274/37 |
| 3,578,340 | 5/1971 | Fortune | 274/23 A |

*Primary Examiner*—Richard E. Aegerter
*Assistant Examiner*—John W. Shepperd
*Attorney, Agent, or Firm*—Christie, Parker & Hale

[57] ABSTRACT

There is described a novel suspension for mounting a phonograph transducer cartridge which has a stylus engageable in the groove of a phonograph record disc. The suspension mounts the cartridge for movement in the suspension only in a direction normal to the disc. A support has an operating position above a plane of rotation of the disc. A pair of carrier members are disposed on opposite sides of the position of a cartridge in the suspension, and cooperatively define a pair of opposing parallel, convexly-curved cylindrical surfaces. The carrier members are mounted to the support for rotation about a respective pivot axis. Each pivot axis is spaced from the respective cylindrical surface in a direction away from the other member, is parallel to the respective cylindrical surface directrix, and is parallel to the disc plane of rotation. Flexible strap means are connected to the carrier members for substantially encircling a cartridge positioned between the cylindrical surfaces. The strap means also function to hold an encircled cartridge in substantially frictionless rolling contact with the cylindrical surfaces and to constrain an encircled cartridge to move relative to the support in the suspension without rotation along a line which is normal to the disc plane. Link means are coupled between the carrier members for causing both carrier members to move in synchronism in opposite directions about their respective pivot axes in response to loads applied to an encircled cartridge in a direction normal to the disc plane.

18 Claims, 10 Drawing Figures

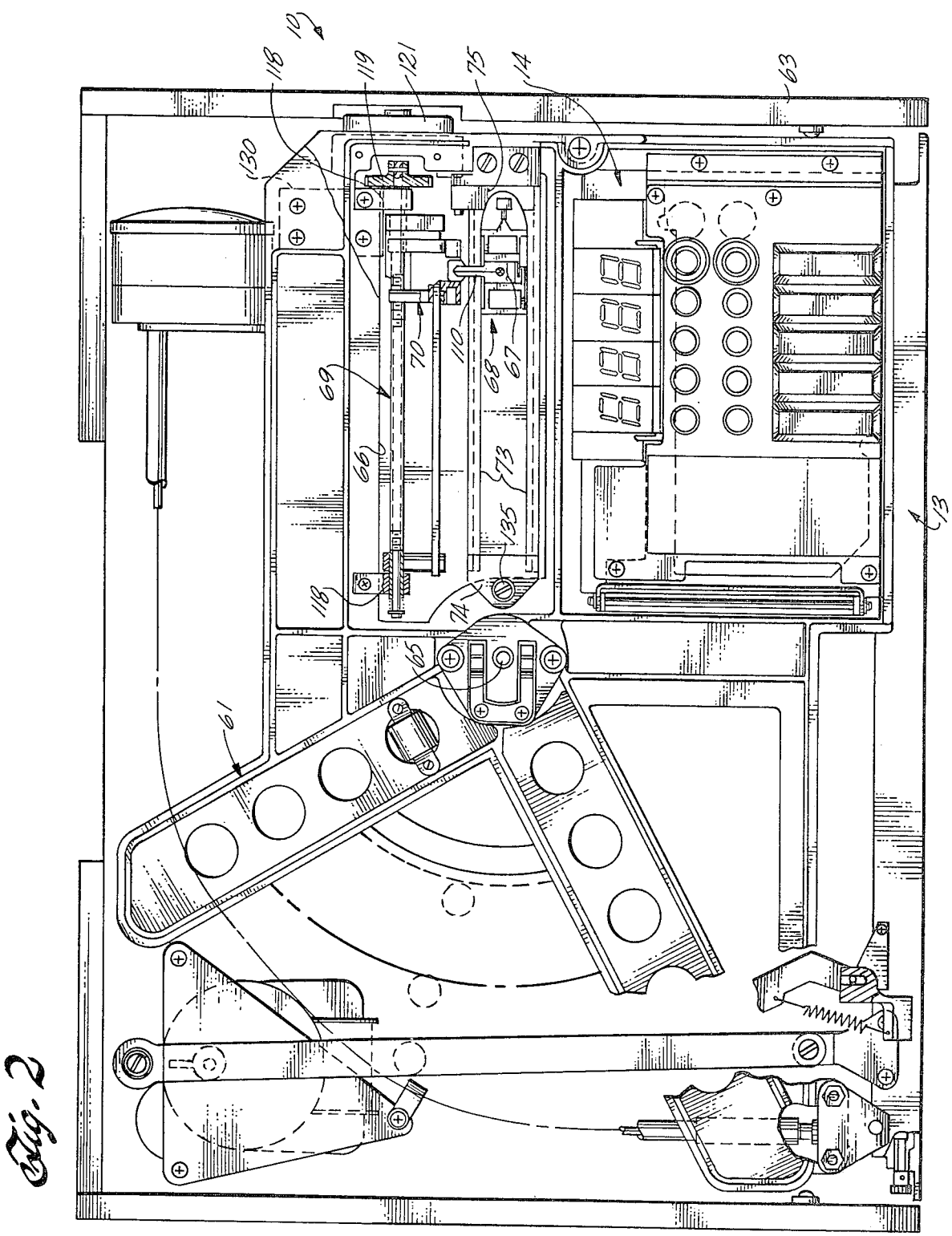

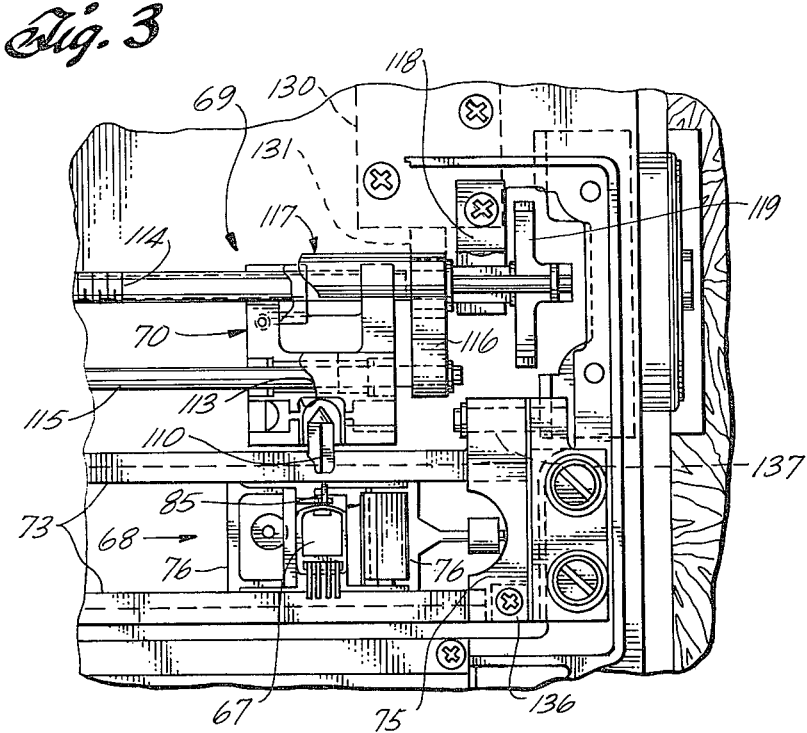
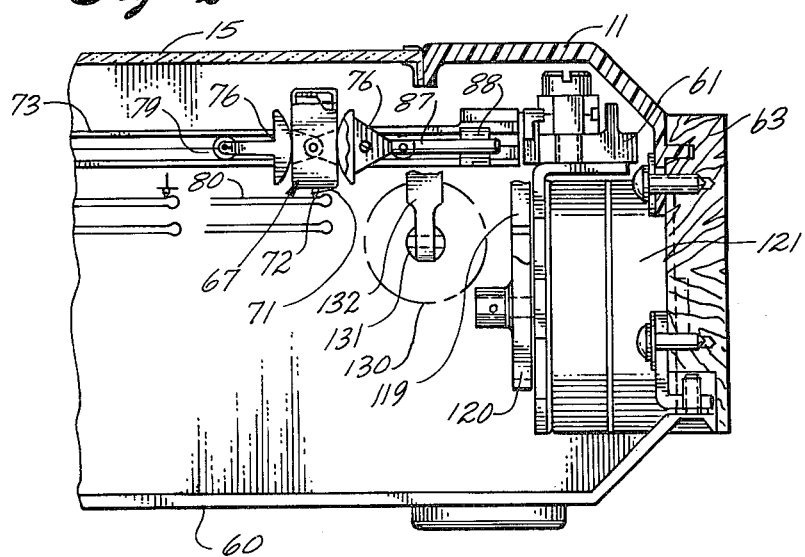

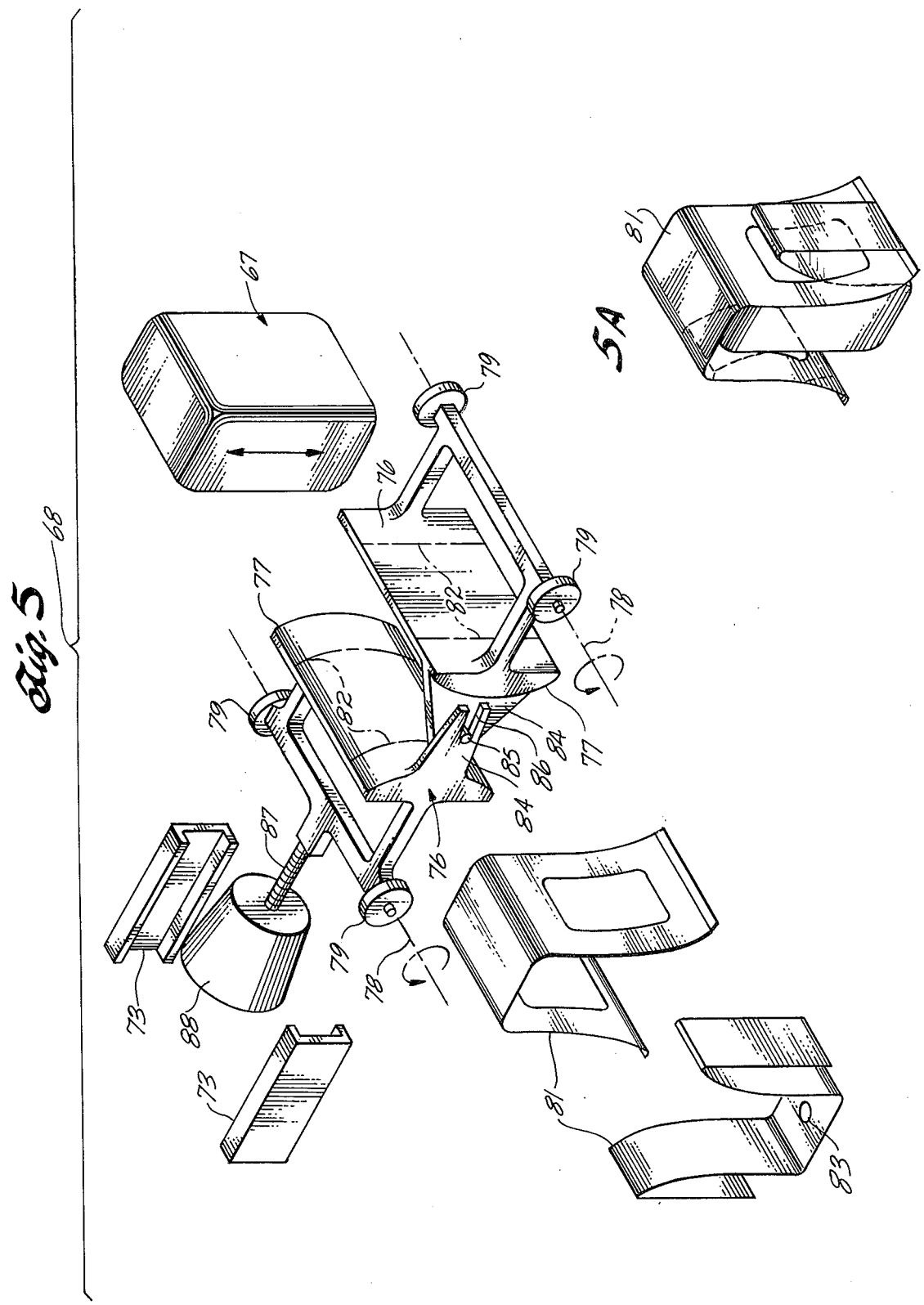

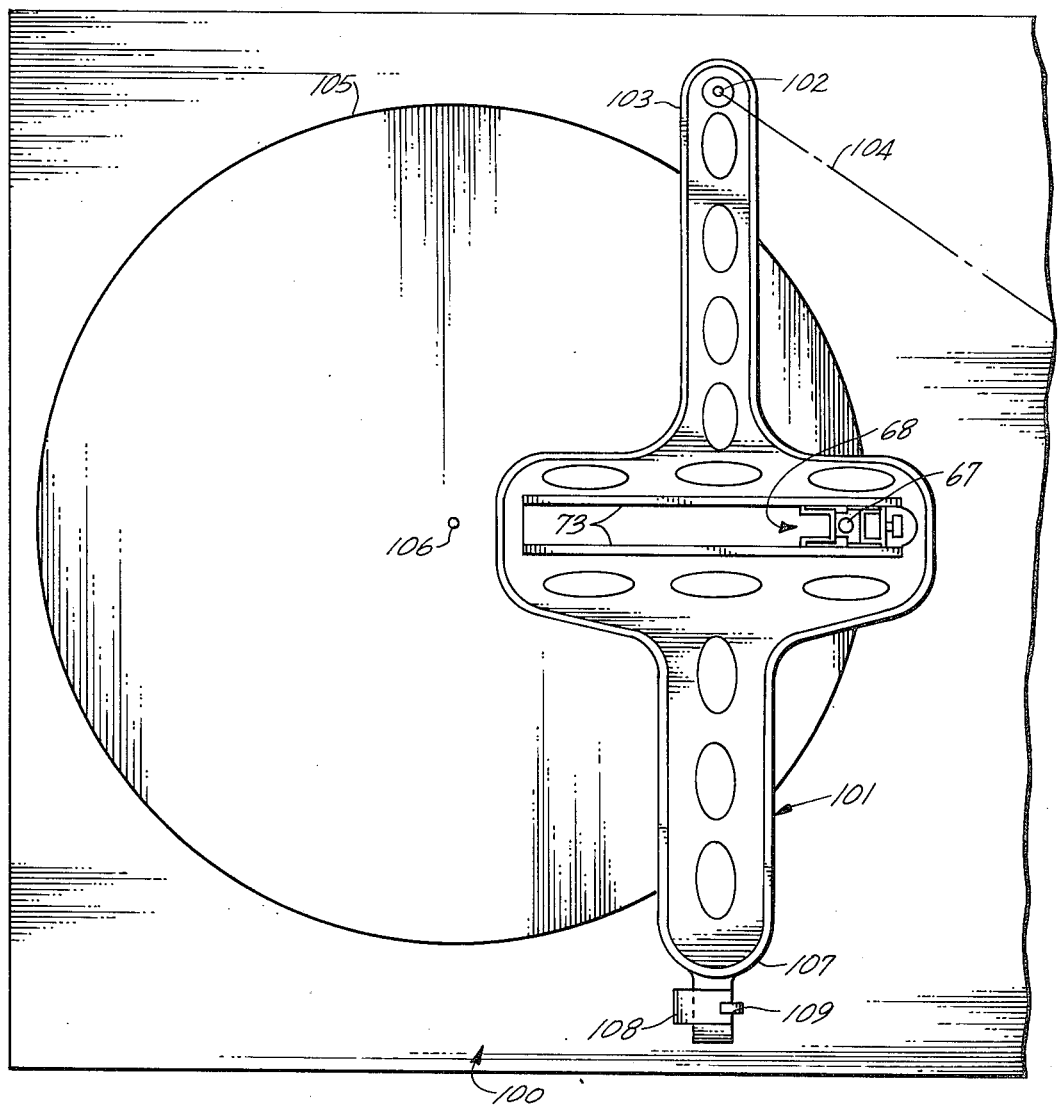

STYLUS CARTRIDGE SUSPENSION FOR RECORD PLAYERS

BACKGROUND OF THE INVENTION

1. Field of the Invention

This invention relates to record players, i.e., to equipment useful with a phonograph record disc to sense by a stylus, and to convert by a transducer to an electrical signal, audio information contained in the contours of the spiral groove defined in the disc. The transducer cartridge, to which the stylus is mounted, is carried in a novel suspension which enables substantially zero tracking force to be achieved between the stylus and the record disc and which, apart from the overall radial-tracking movement, constrains the cartridge to move without change in the tracking force only perpendicular to the disc's plane of rotation under loads imposed on the stylus by the record.

2. Review of the Prior Art

My prior U.S. Pat. No. 3,658,347 describes a record player in which a phonograph record disc, during playing of the record when a stylus is engaged in the record's spiral groove, is held captive between a driven record supporting turntable below the record and a clamp disc above the record. The stylus is carried by a transducer cartridge which is mounted in a carriage located above the record. The carriage is supported on rollers engaged in rails so disposed that the path of movement of the stylus, overall across the record, is along a line parallel to and radially of the record.

The advantages of radial-tracking record players, as compared to record players in which the stylus and the cartridge are mounted on the end of a long pivoted tone arm, is that the stylus path of movement across the record corresponds to the path of movement traversed by the cutting head of the lathe used to define the master record of which the usual commercially available record is a replica. Thus, in theory, a radial-tracking record player better reproduces the sounds defined in the contours of the walls of the spiral groove of the record.

Virtually all phonograph records now produced, regardless of size, are manufactured to reproduce stereophonic sound. In the cutting of the masters from which the records are reproduced, the cutting tool of the master cutting lathe moves in the cutting head only normal to the master disc (to produce variations in groove depth) and from side-to-side radially of the master disc (to produce local variations in the contour of the groove sidewalls defining the actual audio information); the overall spiral pattern of the groove is generated in the master disc by controlled movement of the lathe cutting head radially of the master disc's axis of rotation.

Thus, to optimally reproduce the sounds recorded in a phonograph record, a record player should limit the motions of the pickup stylus to only those motions which are experienced by the cutting tool used to cut the master disc. Also, the stylus should be mounted in the record player so that it can accommodate these limited motions without any variation in the force with which the stylus engages the record groove. The present record player accomplishes this optimum result significantly better than is the case of record players according to my prior patent, and also better than is the case in other radial-tracking record players now commercially available.

Radial-tracking record players are now commercially available and are marketed in the United States and elsewhere under the tradenames Bang & Olufsen and Rabco, among others. All of these record players mount the stylus and cartridge on the end of an elongate tone arm which is hinged at its other end for rotation of the arm at least in a plane perpendicular to the plane of rotation of a record engaged by the stylus. This is done to enable the stylus and cartridge to move vertically to follow warpage which is common in mass-produced phonograph records. Such hinging of the tone arm enables the stylus to have a freedom of motion not permitted to the cutting tool in the manufacture of the master disc; to at least this extent, these other radial-tracking record players depart from the optimum tracking characteristics described above. The present record player does not afford this additional mode of motion to the stylus and cartridge. The other radial-tracking record players mentioned above suffer from additional disadvantages which are overcome in the present record player.

SUMMARY OF THE INVENTION

This invention provides a radial-tracking record player in which the stylus better conforms to the optimum tracking characteristics described above. The instantaneous motions of the stylus during playing of a record are limited to side-to-side motions in the record groove and to only linear motion of the stylus and its supporting transducer cartridge along a line perpendicular to the record plane of rotation. The stylus is enabled to conform to warpage of a record with greatly reduced variation, if any, in the force with which the stylus engages the record. These advantages are produced by a novel cartridge suspension mechanism in the present record player.

These advantages preferably are embodied in a record player which includes many of the advantages and features of the record player described in my prior U.S. Pat. No. 3,658,347. Thus, the preferred embodiment of the present record player requires only that the user place a record on receiving supports and actuate a control button to command the player to PLAY the record; thereafter, the record is handled automatically by the player and brought into engagement with the stylus. During playing of the record, it is fully enclosed in the record player and is protected from damage.

Also, the preferred embodiment of the present record player includes a programmable control arrangement which gives a user heretofore unavailable operating choices and control over which passages on a record will be played in any sequence desired. That is, the record player enables a user to select the precise beginning and end points of a recorded passage of interest, to repeat the playing of the passage any number of times desired, and to play desired passages in any sequence desired, even a sequence different from the sequence defined in the phonograph record. Commands for such operations may be entered into the record player manually by the user at the time of playing a particular record, or the necessary commands may be recorded on the record itself for use later when it is actually desired to play the record; the latter feature is believed to be of great benefit to radio stations and the like.

Generally speaking, in one aspect thereof this invention provides an improved suspension for mounting a phonograph transducer cartridge, which has a stylus engageable in a groove of a phonograph record disc, so that the cartridge undergoes only translatory movement in the suspension in a direction normal to the disc in response to displacing loads applied to the stylus by the disc. The suspension includes a support which is positionable in an operating position above a plane of rotation of the disc proximately above the operating position of the plane. A pair of carrier members are disposed on opposite sides of the position of a cartridge in the suspension. The carrier members cooperatively define a pair of parallel, convexly-curved cylindrical surfaces which face each other. Means are provided for mounting the carrier to the support for rotation of each carrier member relative to the support about a respective one of a pair of pivot axes. The pivot axes are each spaced from the respective cylindrical surface in a direction away from the other carrier member, are disposed parallel to the respective cylindrical surface directrix, and are parallel to the disc plane of rotation in the operating position of the support. Flexible strap means are connected to the carrier members for substantially encircling a cartridge positioned between the cylindrical surfaces. The flexible strap means also serve to hold an encircled cartridge in substantially frictionless rolling contact with the cylindrical surfaces, and to constrain an encircled cartridge to move, without rotation, relative to the support in response to loads applied to an encircled cartridge in a direction normal to the disc plane of rotation when the support is in its operating position. Link means are coupled between the carrier members for causing both carriers to move in synchronism in opposite directions about their respective pivot axes in response to loads applied to an encircled cartridge in a direction normal to the disc plane of rotation.

In another aspect, this invention provides a record player in which a phonograph record disc is supported in a playing position on a turntable which is rotatably driven at a selected speed about an axis. The disc, in its playing position, is engageable with a stylus supported by a transducer cartridge which is held in a carriage. The cartridge carriage is movable along a line radially of the turntable above the turntable in response to tracking engagement of the stylus in the spiral groove of the disc. Such a record player is characterized in that it includes lift means which are selectively operable at any location of the carriage along its line of movement for lifting the carriage away from the turntable, thereby to move the stylus out of engagement with the record on the turntable. The provision of the lift means in the record player makes possible the connection to the carriage of a mechanism for traversing the carriage to any desired position along the line of movement of the carriage at any time, even during the course of playing a record.

DESCRIPTION OF THE DRAWINGS

The above-mentioned and other features of this invention are more fully set forth in the following detailed description of the presently preferred embodiment of the record player and of alternative embodiments of certain aspects of the record player, which description is presented with reference to the accompanying drawings, wherein:

FIG. 2 is a top plan view of the record player of FIG. 1, with the cover thereof removed;

FIG. 3 is a fragmentary plan view, partially in section, of the cartridge suspension in its preferred form;

FIG. 4 is an elevation view, partially in section, of the cartridge suspension mechanism;

FIG. 5 is a perspective exploded view of the components of the transducer cartridge suspension mechanism;

FIG. 5A is a perspective view of the flexible strap arrangement used in the suspension shown in FIG. 5 to hold the cartridge in place;

FIG. 7 is a plan view of another record player incorporating the suspension mechanism and radial-tracking aspects of the record player shown in FIG. 1.

DESCRIPTION OF THE ILLUSTRATED EMBODIMENTS

Figure 1:
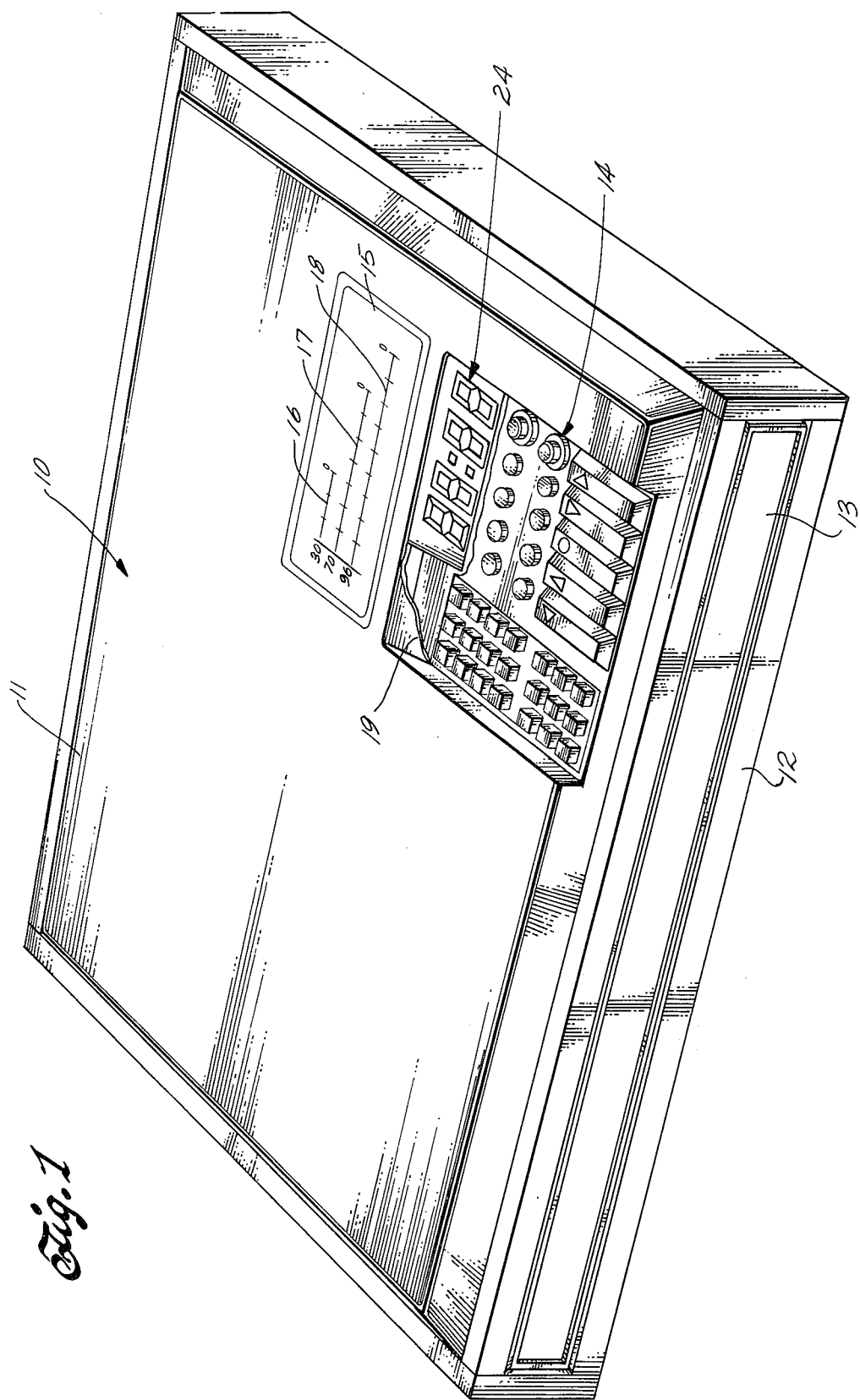
FIG. 1 is a perspective of the presently preferred record player according to this invention.

FIG. 1 is a perspective view of a programmable radialtracking record player 10 which is the presently preferred record player according to this invention. Record player 10 has overall dimensions of 3⅛ inches high by 17 inches wide by 13 inches deep. The top of the record player is defined by a cover 11 which is normally not openable by a user during operation of the record player. Instead, access to the interior of the record player, for the purpose of inserting a phonograph thereinto, is obtained via an openable door 13 which is incorporated in the front face 12 of the record player and which is shown in its closed position in FIG. 1. Preferably the cover 11 of record player 10 is defined of a smoked plastic material which appears to resemble obsidian or polished ebony at a distance, but which, from a close viewing position, enables an observer to see into the interior of the record player.

A control and operating panel 14 is located in the lower right quadrant of the cover 11. A transparent window 15 is provided through the cover immediately across the top of control panel 14, and is located generally above the path of movement of the stylus and its transducer cartridge radially of the axis of the turntable of the record player. The record player is constructed to play records of 7 inch, 10 inch or 12 inch diameter. Corresponding scales 16, 17 and 18 are carried by window 15 to enable the user to visually follow and determine the position of the stylus at any time across the width of the playing (audio information carrying) portion of the spiral groove of a record in the record player between the run-in and run-out portions of the groove. The relationship between the above-described externally visible features of record player 10 and its internal, normally inaccessible mechanisms will be apparent from the following description.

In the vicinity of control panel 14, the cover is recessed, as at 19, and suitable openings are provided through the bottom of the recess to enable projection into the recess of the pushbutton portions of the control command and data input switches which are all mounted on a common support in the record player below the recess. The display devices shown in FIG. 1 as part of display section 24 of control panel 14 are actually mounted below the cover, to be visible through the cover when illuminated, and this is shown by the content of FIG. 1.

The individual controls involved in control panel 14, their functions, and the operations they control are described in articles published concerning record player 10 and appearing at (1) *Design News*, issue of Mar. 21, 1977 at pages 54 and 55, and (2) *Interface Age*, issue of May, 1977 at pages 16 through 27. Other aspects of the record player are described in these articles and also in the article at pages 36 and 37, *Design News*, issue of Mar. 21, 1977. Reference is made to these articles for information about aspects of the record player other than the stylus suspension which is claimed and described in detail herein. Certain of these other aspects of the record player are illustrated, in part, in the accompanying drawings.

The principal structural elements of record player 10 are a bottom pan 60, preferably a casting, and a top frame 61, also preferably a casting. The top frame is supported on the bottom pan on suitable posts to dispose the top frame generally horizontally parallel to the bottom pan, but closely adjacent to the underside of cover 11, thus providing a generally open space within the interior of the record player into which a record may be moved by operation of door 13. The cover 11 preferably is carried in a wooden frame 63 which defines the outer perimeter of the record player. The wooden frame is hinged to bottom pan 60 along the rear of the record player and is held in position on the bottom pan by suitable screws. Door 13 has a closed position in an opening formed in the front face of the frame.

FIG. 2 is a simplified plan view, with some parts broken away and others shown in section, of the structure which is visible within the interior of record player 10 when cover 11 is opened. A major reference point of interest in the record player is the centerline, i.e., axis of rotation, 65 of a record 80 disposed in the record player. As viewed in FIG. 2, top frame 61 has an elongate opening 66 formed in it to the right of record axis 65 above control panel 14. The window 15 in cover 11 is located above this opening. The transducer cartridge and its stylus, its support suspension and carriage, the support tracks for the cartridge carriage, and the cartridge positioning and positioning sensing mechanisms are all located in top frame openings 66; see FIG. 2. The stylus transducer cartridge is indicated generally in FIG. 2 at 67, the cartridge suspension and carriage at 68, the cartridge positioning and position-sensing mechanism at 69, and the follower member of a positioning and position-sensing mechanism at 70.

The preferred transducer cartridge used in record player 10 is a Bang & Olufsen stereophonic phonograph transducer cartridge Type MMC-4000, which is modified in the manner described below. The cartridge is disposed in the record player so that the sensitive axis of its transducer mechanism is vertical, i.e., parallel to record axis 65. The Bang & Olufsen cartridge is modified in the manner in which the diamond stylus is coupled to the transducer movement. In this type of cartridge, as supplied by the manufacturer, the stylus is carried on the unsupported end of an elongate, straight, tubular cantilever beam which is connected to the moving elements of the transducer movement. The stylus is mounted on that side of the cantilever support which is disposed downwardly when the cartridge is mounted as intended by the manufacturer, i.e., in a generally horizontal manner, so that the stylus support cantilever is disposed at an angle of about 20° to the plane of rotation of the record with which the stylus is engaged; compare FIG. 10 of my prior U.S. Pat. No. 3,658,347. To adapt this cartridge, i.e., the Bang & Olufsen Type MMC-4000 cartridge, for use in record player 10, the stylus cantilever is shortened to about ¼ of its original length, and the stylus is bonded into the end of the shortened stylus support tube. When the cartridge is mounted vertically relative to the record, the stylus is disposed along the sensitive axis of the cartridge transducer movement, and the stylus support arm is loaded essentially only axially as it follows the contours of the record groove which bear the audio information recorded on the phonograph record disc. It will be understood, however, that the stylus is also continuously loaded by the outer sidewall of the spiral groove as the record is rotated past the stylus; it is this side-loading of the stylus which is relied upon to drive the cartridge radially of record axis 65.

As shown best in FIGS. 3–5c, the stylus suspension carriage 68 is disposed between and carried by a pair of support rails 73 which, in cross-section, have a configuration resembling a structural channel, each channel being disposed so that the flanges thereof extend toward the other channel. The inner and outer ends of the rails are mounted to inner and outer end plates 74 and 75 which, in turn, are connected to top frame 61. Rails 73 and plates 74 and 75 define the basic support structure within which the stylus suspension carriage is movable along a path above and parallel to the "playing" position of a record in record player 10. The stylus suspension carriage includes a pair of substantially identical carrier members 76, the principal portions of which are disposed on opposite sides of the cartridge 67 between rails 73. The opposing faces of the carrier members define preferably identical, parallel, convexly curved cylindrical surfaces 77 (see FIG. 5). The terms "cylinder" and "cylindrical" are used in their broad mathematical meanings to describe surfaces 77 of carrier members 76. That is, a cylinder, in the mathematical sense, is defined as the surface traced or generated by a straight line, the generatrix, moving in space at all times parallel to another straight line, the directrix. Preferably, the cylindrical surfaces 77 are circularly cylindrical. Also, in the carriage suspension shown in FIG. 5, for example, the arrangement is geometrically balanced by virtue of carrier member pivot axes 78 being spaced equidistantly from the respective cylindrical surfaces 77, with the result that surfaces 77 in the preferred arrangement have equal radii of curvature. It will be appreciated, however, that it is not necessary that the cylindrical surfaces be of circularly cylindrical configuration or that they be identical; a change in the effective length between one cylindrical surface and the associated pivot axis, relative to the corresponding length associated with the other carrier member, can be compensated, in terms of the result desired in the cartridge suspension mechanism, by an adjustment in the curvature of one cylindrical surface or the other. It is important, however, that the directrices of the two cylindrical surfaces be parallel to each other. Preferably, as in the illustrated embodiment shown in FIG. 5, the directrices of the cylindrical surfaces 77 coincide with pivot axes 78.

The carrier members 76 are mounted to support rails 73 for rotation of each carrier member relative to the rails about a respective one of pivot axes 78. In carriage suspension 68, this mounting is accomplished by roller wheels 79 which, as shown in FIG. 4, are engaged between the opposing surfaces of the flanges of the respective ones of rails 73. The mounting of the carrier members to the support rails is such that the pivot axes (a) are spaced from the respective cylindrical surface 77 in a direction away from the other carrier member 76, (b) are parallel to the respective cylindrical surface directrix (in the preferred embodiment, the pivot axes and directrices coincide), and (c) are parallel to the disc plane of rotation when the carrier member supports, i.e., support rails 73, are in operating position relative to a record in record player 10. Where the directrices and pivot axes of the respective carrier members do not coincide, the mounting of the carrier members to the support rails is also arranged to provide for movement of at least one of the pivot axes toward and away from the other pivot axis in a direction which is parallel to the disc plane of rotation when the carrier member support is in operating position relative to a record. It will be observed that, in suspension mechanism 68, both pivot axes 78 are movable together in a direction parallel to the plane of rotation of record 80 as shown, for example, in FIG. 4. The playing position of record 80, as shown in FIG. 4, is the upper position of the record; the lower position of the record corresponds to the position of the record on first introduction into the record player when the turntable is in its lowered position along its axis of rotation.

Figure 5B:
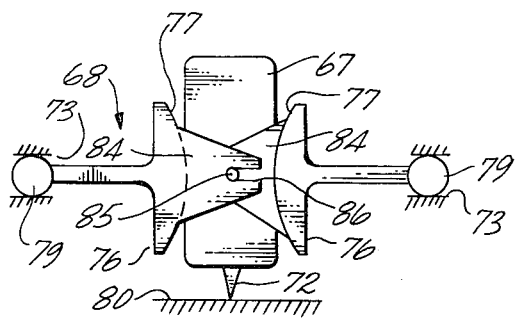
FIG. 5B is a schematic elevation view of the suspension mechanism in one state thereof.
Figure 5C:
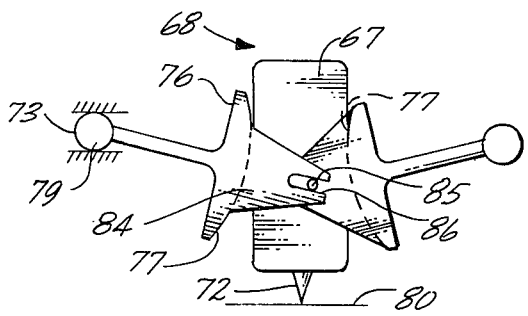
FIG. 5C is a view similar to the view of FIG. 5B showing the suspension mechanism in another state thereof.

Suspension mechanism 68 also includes a flexible strap arrangement 81 (see FIG. 5A) which is coupled between the carrier members 76 and cartridge 67 to (a) substantially encircle the cartridge when it is positioned between cylindrical surfaces 77, (b) for holding an encircled cartridge in substantially frictionless rolling contact with cylindrical surfaces 77, and (c) for constraining the encircled cartridge to move relative to the support, i.e., rails 73, in response to loads applied to the cartridge in a direction normal to the plane of rotation of record 80. Preferably, the strap arrangement 81 is fabricated of thin (0.001 inch) Mylar film and, when installed, has the configuration shown in FIG. 5A which shows the strap arrangement in its actual geometry in use. In FIG. 5, the strap arrangement 81 has been broken into two parts to better illustrate its geometry and relationship to both the cartridge and the carrier members. As seen in FIG. 5A, the strap passes twice through itself to define a figure resembling an "8" having three lobes; the two end lobes encircle the major portions of the carrier members which define surfaces 77, and the center lobe encircles the cartridge. The coupled position of the flexible strap arrangement to the carrier members is indicated in FIG. 5 by broken lines 82. A hole 83 is formed through the strap arrangement at an appropriate location in its central lobe to enable the stylus support arm to project from the cartridge per se through the strap arrangement toward record 80.

Suspension 68 also includes link means which are coupled between carrier members 76 for causing both carrier members to move in synchronism in opposite directions, i.e., one clockwise and the other counterclockwise, about their respective pivot axes 78 in response to loads applied to an encircled cartridge 70 in a direction normal to the plane of rotation of record 80. Usually such loads are applied to the cartridge by the localized contour of the record groove, but more significantly by warpage of the record. The linkage between the carrier members is defined in suspension 68 by a pair of fingers 84 which extend from opposed ends of each of cylindrical surfaces 77 toward the other carrier member, by a pin 85 which extends from one finger 84, and by a pin receiving slot 86 formed in the end of the other finger. Pin 85 is centered midway between cylindrical surfaces 77. A link arrangement, as described above as shown in FIG. 5, may be provided at both ends of the carrier members, if desired.

A threaded shaft 87 extends from one of carrier members 76, at a location between that carrier member's roller wheels 79, in a direction which preferably causes the axis of shaft 87 to pass through the center of cylindrical surface 77 of that carrier member. A counterbalance mass 88 is threadably engaged on shaft 87. The position of counterbalance mass 88 on shaft 87 is adjustable to define the tracking force which is produced between the stylus 72 carried by cartridge 67 and record 80 during play of the record in record player 10. This tracking force can be adjusted to be essentially zero. That is, the position of mass 88 on shaft 87 is adjusted to compensate for the tendency of the carrier members, and the cartridge engaged between them, to rotate in a direction causing the cartridge to move toward the playing position of record 80.

From the foregoing description of cartridge suspension mechanism 68, it will be apparent that the coupling of the cartridge to carrier member 76 by flexible strap arrangement 81 provides an essentially frictionless and free floating suspension of cartridge 67 between support rails 73. Accordingly, the cartridge suspension has very high compliance to loads imposed on the cartridge along the line of the stylus support member 71. This means that the cartridge is virtually insensitive to loads imposed upon it by warpage in a record 80, and that the transducer movement of cartridge 67 produces electrical output signals which are accurately indicative, to an extent which has heretofore been impossible to achieve as a practical matter, of the audio information recorded in the groove of record 80. Because the carriage suspension is itself supported between rails 73 on roller wheels 79, the entire cartridge suspension is movable along a path radially of record 80; rails 73 are disposed parallel to and on opposite sides of a line radially of turntable axis 65. It is therefore apparent that cartridge 67, and stylus 72 carried thereby, are mounted in record player 10 to be sensitive to only those motions which are experienced by the cutting tool of the lathe used to cut the master disc from which record 80 is replicated. This suspension is of very high compliance in veiw of the low mass of the moving parts of the suspension, and in view of the friction-free or very low friction connections within the suspension itself and of the suspension to support rails 73.

Figure 6:
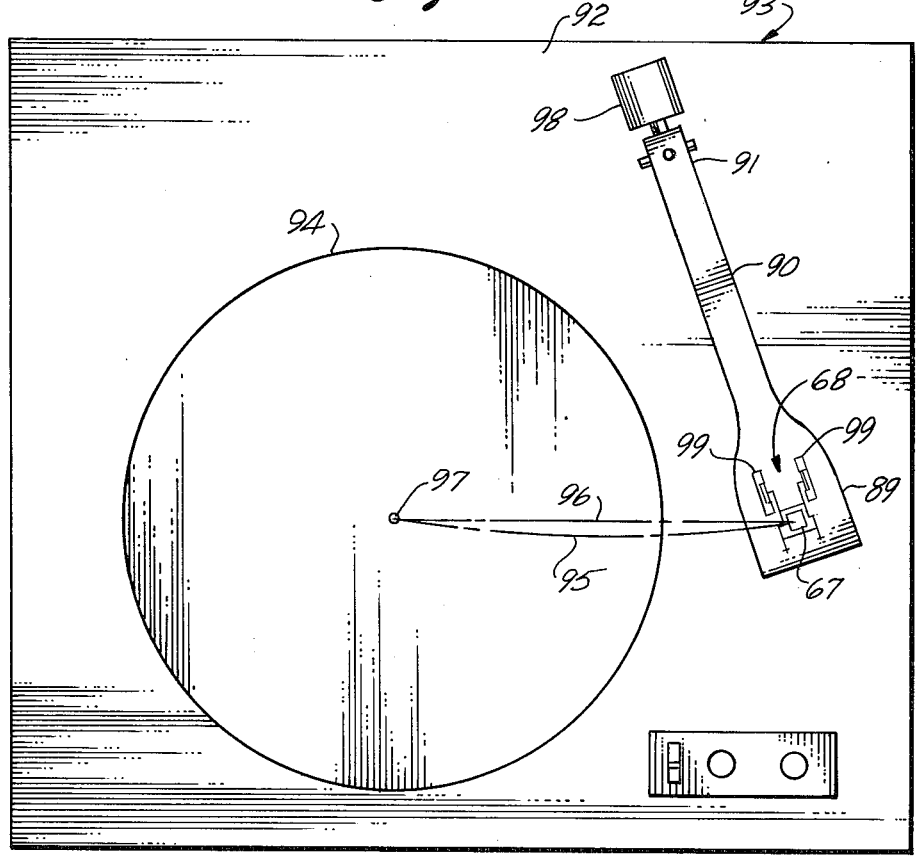
FIG. 6 is a simplified plan view showing the stylus suspension mechanism illustrated in FIGS. 3–5 embodied in a record player of more conventional configuration than that shown in FIG. 1.

It will be appreciated that cartridge suspension 68 has utility in record players other than record player 10. Thus, FIG. 6 shows the use of suspension 68 in the unsupported end 89 of a tone arm 90 of substantially conventional configuration. The tone arm is pivoted, both vertically and horizontally, at its opposite end 91 to the mounting board 92 of a record player 93 which, in common terminology, is referred to simply as a "turntable". Rotatably driven record support table 94 is also mounted to the mounting board so that, when the tone arm is moved about its vertical pivot axis, the position of the stylus at the opposite end of the tone arm traverses the circular arc 95 which approximates a radius 96 from the table axis of rotation 97. Preferably tone arm 90 is counterbalanced, as by counterbalance mass 98, so that it is essentially statically balanced and the desired tracking force is defined between the stylus and a record supported on table 94 by adjustment of mass 98. Tone arm 90 is freely movable about its vertical pivot axis, but is highly damped against motion about its horizontal pivot axis to render the unsupported end of the tone arm substantially resistant to movement in response to transient loads applied vertically to it.

FIG. 6 shows that one of the pivot axes associated with the carrier members of suspension 68 may be fixed relative to the suspension support which, in this case, is defined by the tone arm structure itself. The other pivot axis of the suspension preferably is movable relative to the support, as by the inclusion of short rails 99 in the structure of the tone arm.

FIG. 7 illustrates that the improved cartridge suspension described above may be incorporated in a turntable 100 in combination with a radial-tracking arrangement, as shown in FIG. 2, for example. In this instance, cartridge suspension 68, substantially as described above with respect to FIG. 2, for example, is disposed between a pair of parallel support rails 73 which are in turn carried by a rigid support frame 101 which is pivotally mounted, as at 102, at one end 103 of the frame to the basic structure of turntable 100. Frame 101 has a playing position which is shown in solid lines in FIG. 7, and also a retracted position indicated by broken line 104 in FIG. 7. In its retracted position, the frame is moved out of a location above the record support table 105 so that a record can be placed on and removed from the table. Rails 73 are so disposed in frame 101 that, when the frame is in its operating position as shown, the rails are spaced parallel to and on opposite sides of a line radially from the axis of rotation 106 of table 105. Frame 101 may be a rigid casting, for example, of sufficient length to span the rotary table 105 when the frame is in its operating position. It is supported at its end 107, opposite from pivot 102, in its operating position by a support 108 in which the frame may be locked, as by a latch mechanism 109, to fix the operating position of frame 101. Turntable 100, as shown in FIG. 7, is a manually operable radial-tracking record player incorporating the highly compliant, low tracking force cartridge suspension mechanism described above.

Referring to FIGS. 2, 3 and 4, it was noted above that cartridge positioning and position sensing mechanism 69 includes a cartridge follower member 70. From the following description, it will be appreciated that this mechanism may be used in association with a cartridge suspension mechanism different from cartridge suspension mechanism 68 described above with reference to FIGS. 2–5C, 6 and 7. In record player 10, the stylus follower member 70 cooperates with an arm 110 which is secured to the top of cartridge 67, and which extends across the top of that one of rails 73 which lies to the rear of record player 10. The arm extends along a line perpendicular to the path of movement of the cartridge radially of turntable axis 65. The upper surface of arm 110 carries a reference mark which is observable by a user through window 15, and which, in cooperation with an appropriate one of scales 16, 17 and 18, visually indicates the position of the stylus at any point during the course of playing a record. The reference mark is vertically aligned with the position of stylus 72 in cartridge 67. The end of the arm 110 which lies remote from the cartridge defines a downwardly extending finger which cooperates in a recess 113 formed in the forward extent of follower member 70.

The follower member is disposed adjacent to the cartridge, as shown in FIGS. 2 and 3, for movement along a path which is parallel to the line of movement of cartridge 67 radially of turntable axis 65. The follower member is normally out of physical contact with the cartridge, but follows movement of the cartridge during playing engagement of stylus 72 with record 80. Sensing means are carried by the follower member for cooperation with arm 110 for sensing the position of the cartridge along its line of movement, and for generating a signal which is indicative of the relative positions between the cartridge and the follower member as the cartridge and the follower member move along their parallel paths. Further, drive means are coupled to the sensing means to be responsive to the signal generated by the sensing means. These drive means are also coupled to the follower member for driving the following member to cause the signal to tend toward zero. Thus, the relative position between the cartridge and the follower member is continually monitored, a signal is generated indicative of the relative positions between these elements, and that signal is relied upon to cause the follower member to be driven parallel to the radial line of movement of the cartridge to cause the follower member to stay very closely in a predetermined alignment with the cartridge.

More specifically, a finely threaded leadscrew 114 is supported adjacent the rear edge of top frame opening 66 parallel to rails 73. The rear extent of follower member 70 is engaged with the leadscrew so that the follower member is driven in one direction or the other, dependent upon the direction of rotation of the leadscrew, along a path parallel to rails 73. The follower member is also supported forward of the leadscrew on a rod 115 which is parallel to the leadscrew and which is supported at its opposite ends in forwardly extending lugs 116 of bracket 117. The bracket is rotatably journalled about the leadscrew adjacent the opposite ends of the leadscrew. Rod 115 passes through the follower member to the rear of recess 113. The normal position of bracket 117 places leadscrew 114 and rod 115 substantially in a common plane parallel to the plane of rotation of record 80. At its extreme right end, as viewed in FIGS. 3 and 4, a gear 119 is secured to the leadscrew shaft to the right of a support arm 118 in which the leadscrew is rotatably journalled. Gear 119 cooperates with a gear 120 which is fixed to the output shaft of a stepping motor 121 which is mounted to top frame 61 below gear 119. The stepping motor is a reversible mechanism. It is apparent, thus, that the follower member 70 is driven in one direction or the other parallel to rails 73 dependent upon the direction of rotation of the stepping motor. The output signal derived from the sensing means in the follower member is used to control the amount and direction of operation of the stepping motor, thereby to cause the follower member to be driven to closely follow the motion of the cartridge within predetermined limits.

It is desirable that the cartridge be able to move radially of the record solely in response to the "feed" of the spiral groove of the record 80 past stylus 72 without constraint in any respect (save for the small amount of friction associated with rollers 79) during play of record 80. Accordingly, the cooperation of the sensing means within the follower member with the cartridge is a cooperation which is not dependent upon physical contact between the cartridge and the follower member. The preferred sensing means is described in the *Interface Age* article cited above.

In record player 10, the pitch of the leadscrew 114, the gear ratio defined by the gears 119 and 120, and the rotation of gear 120 for each step of motor 121 all cause the follower member to be moved approximately 0.02 millimeter for each step of the stepping motor.

The logic and memory aspects of the control system for record player 10 include a counter in which is accumulated a count of the pulses required to operate the stepping motor sufficiently to drive the follower member from any given position along its path of movement back to a "base" position thereof which is defined at the limit of its travel along rod 115 adjacent to turntable axis 65. On operation of a position control button on control panel 14, the number accumulated in this counter, translated into millimeters from the "home" position of the follower member, is displayed in the visual display section 24 of control panel 14. The width of the audio information-carrying band on a 12 inch record is 96 mm. The counter associated with the "base" position of the stylus has a capacity sufficient to accumulate a count equal to the member of pulses necessary to operate motor 121 to drive the follower member 70 a distance of 96 mm. It is this count which is actually assigned to memory when the computer in the record player is programmed to determine the manner in which a given record is to be played. The complement of this count is displayed, assuming a 12 inch record has been selected by operation of button 35, when the position button is depressed. The number displayed in display section 24 of control panel 14 on operation of the position button is the distance in millimeters of the stylus from its "home" position. The "home" position is defined at the run-in portion of a record of interest, i.e., at the outer margin of a record. The width of the information band of a 10 inch record is 70 mm, and is 30 mm for a 7 inch record. Thus, when buttons the player is are operated to select a 7 inch or a 10 inch record respectively, counts corresponding to the figures "66.00" and "26.00" are automatically subtracted from the count in the counter which cumulates the count complementary to the count in the counter associated with the "base" position of the stylus; this adusted count is displayed in display section 24 on operation of the position button when a 7 inch or 10 inch record has been selected. Thus, the record player operates internally in terms of the "base" position of stylus 72 close to axis 65 (which position is common to all sizes of records), but communicates via display section 24 to a user of the record player in terms of the outer edge of whatever record is of interest to the user because people usually think in terms of the beginning of a record.

Mechanism 69 is also arranged for positioning cartridge 67 in any desired position along its path of movement radially of turntable 65, either preparatory to the playing of a record in the conventional manner, preparatory to playing of a selected passage of the record lying at some selected point between the run-in and run-out portions of the record groove, or for causing a selected portion within a record to be repeated one or more times. Accordingly, the cartridge positioning and position sensing mechanism 69 is arranged to lift the cartridge in its suspension to cause stylus 72 to be moved out of contact with record 80, and then to move the cartridge in either direction along its path of movement relative to the record.

The cartridge lift mechanism includes a solenoid 130 having a reciprocable armature 131 which is connected to a depending lug 132 of bracket 117, which in turn supports rod 115 along which follower member 70 is movable in response to rotation of leadscrew 114 (see FIGS. 3 and 4). When the solenoid is operated, its armature 131 is extended to cause bracket 117 to be rotated about the leadscrew in a direction which causes shaft 115 to revolve upwardly out of its normal position. Such movement of the rod moves the follower member 70 so that the bottom of recess 113 engages the lower end of the cartridge arm finger, and lifts the cartridge in its suspension 68. In this manner, the stylus 72 is lifted out of contact with record 80 while the record is in its playing position within the record player.

The bottom of follower member recess is defined by two sloping surfaces 133 which intersect along a line equidistantly between the sidewalls of the recess and perpendicular to the follower member path of movement. The lower end of the cartridge arm finger defines a pair of sloping surfaces, the line of intersection between these surfaces being parallel to the line of the recess intersection of sloping surfaces. Each of the finger surfaces is parallel to a respective one of the recess bottom surfaces. Therefore, as the forward portion of follower member 70 is raised in response to operation of solenoid 130, the sloping surfaces engage each other and cause the cartridge to assume its desired predetermined positional relationship relative to the follower member. In this situation, the position of the follower member along its path of movement, as determined by the count of the number of stepper motor pulses relative to the "base" position of the follower at that instant, corresponds precisely to the position of the cartridge.

Stepping motor 121 has two operating modes. In one operating mode, it is operated by discrete pulses which are supplied to it in response to the difference signal produced by a comparison circuit during play of a record to cause the follower member 70 to tend to maintain its predetermined positional relationship relative to the cartridge as the cartridge moves in response to engagement of stylus 72 with the record groove. The second operational mode of the stepping motor is a slew mode in which the motor is operated rapidly to drive the follower member for the purpose of disposing the cartridge in a predetermined position. Operation of the stepping motor in its slew mode corresponds to the high speed traversing movement of the cartridge. Solenoid 130 is functionally interlocked with the stepping motor so that the stepping motor cannot be operated in its slew mode unles and until the solenoid is operated to raise stylus 72 out of engagement with record 80. This interlock function is performed by a read-only memory which is a component of the overall record player control system. Traversing of the cartridge to a predetermined position is accomplished by inserting into an appropriate "desired position" counter a number corresponding to the desired position of the cartridge, and then operating the stepping motor in its slew mode until the number in the complementary counter mentioned above equals the number in the "desired position" counter. When the stylus has been moved by operation of the stepping motor in its slew mode to the desired position, energization of solenoid 130 is discontinued to lower the stylus into contact with the record.

It will be apparent from the foregoing description that the stylus can be prepositioned along its path of movement radially of the turntable axis to within 0.02 millimeter accuracy. The width of the spiral groove in record 80 is greater than 0.02 millimeter. Thus, the stylus can be prepositioned at any desired location relative to the record groove subject only to the ambiguity associated with the angular position of the record relative to the stylus.

The presently preferred stepping motor 121 is a Type SM40-3602 stepping motor manufactured by Fuji Electrochemical Co., Ltd., Tokyo, Japan. It is preferred that the stepping motor control and position circuit be defined by a Fuji Electrochemical driver module, Type SD-01. A Fuji Electrochemical Type SM40-3602 stepper motor has a single step angle of 10°, and has maximum pull-in and pull-out pulse rates of 340 and 510 pulses per second, respectively.

Cartridge 67 is made accessible within record player 10 for various purposes, including changing stylus 72 as it becomes worn. To provide such access to the cartridge and the stylus, the cartridge support rail assembly is mounted to be rotated to provide access to the stylus, for example, but in such a manner as not to interfere with the cooperation between the cartridge and the cartridge positioning and position sensing mechanism. Accordingly, rail inner end plate 73 is connected to the top frame 61 of the record player by a screw 135 (see FIG. 2) and the outer end plate 75 is connected to the frame by a screw 136 (see FIG. 3) and by a hinge pin 137. Hinge pin 137 is aligned parallel to rails 73 between the rails and follower member support rod 15. When screws 135 and 136 are removed, the entire support structure for the cartridge suspension, i.e., the rails 73 and their connecting end plates, with the cartridge and its suspension, may be moved into a more accessible position by rotation of outer end plate 75 about hinge pin 137 having an axis which passes through substantially the center of the cartridge position sensing mechanism. Thus, the cartridge can be moved for service or access out of its normal operating position in the record player without damaging the signal generating mechanism associated with the follower member 70.

It will be appreciated that the foregoing description has been presented with reference to a presently preferred embodiment of this invention and to certain selected alternative embodiments of certain aspects of this invention. The preceding descriptions have been set forth by way of example, not as an exhaustive treatise or catalog of all forms which this invention may take. Accordingly, workers skilled in the art or arts to which this invention pertains will readily recognize that alterations, variations or modifications on the structures, arrangements and systems described above may be made without departing from the scope of this invention, and that the following claims are not to be interpreted as pertaining only to the specific arrangements, structures and procedures described above.

What is claimed is:

1. A suspension for mounting a phonograph transducer cartridge, having a stylus engageable in the groove of a phonograph record disc, the suspension comprising
   (1) a support positionable in an operating position above a plane of rotation of the disc proximately above the operating position of the plane,
   (2) a pair of carrier members disposed on opposite sides of the position of a cartridge in the suspension and cooperatively defining a pair of parallel convexly curved cylindrical surfaces facing each other,
   (3) means mounting the carrier members to the support for rotation of each carrier member relative to the support about a respective pivot axis which is
      (a) spaced from the respective cylindrical surface in a direction away from the other carrier member,
      (b) parallel to the respective cylindrical surface directrix, and
      (c) parallel to the disc plane of rotation in the operating position of the support,
   (4) flexible strap means connected to the carrier members
      (a) for holding a cartridge between the cylindrical surfaces in substantially frictionless rolling contact with the cylindrical surfaces, and
      (b) for constraining a held cartridge to move relative to the support, in response to loads applied to a held cartridge in a direction normal to the disc plane of rotation, without rotation along a line which is normal to said plane when the support is in its operating position, and
   (5) link means coupled between the carrier members for causing both carrier members to move in synchronism in opposite directions about their respective pivot axes in response to said loads.

2. A suspension according to claim 1 wherein the flexible strap means is arranged for substantially encircling a cartridge positioned between the cylindrical surfaces.

3. A suspension according to claim 2 including counterbalance means coupled to one of the carrier members for controlling the force of engagement between a stylus carried by an encircled cartridge and a record disc disposed in the plane of rotation.

4. A suspension according to claim 2 wherein an encircled cartridge has a stylus carrier which extends from the cartridge only along the line of movement of the cartridge relative to the support.

5. A suspension according to claim 4 wherein the stylus is connected to the end of the stylus carrier for loading the carrier principally only axially in response to engagement of the stylus with a record disc.

6. A suspension according to claim 1 wherein the disc plane of rotation is defined by a turntable rotatable about an axis of rotation, and including means mounting the support relative to the turntable so that, when the support is in its operating position, the support is substantially more resistant to movement toward and away from the turntable than is the cartridge.

7. A suspension according to claim 6 wherein the support mounting means is arranged for movement between the operating position thereof and a retracted position in which the support is displaced laterally from the operating position in a direction away from the turntable axis.

8. A suspension according to claim 7 including means for fixing the support in its operating position.

9. A suspension according to claim 6 wherein the carrier member mounting means mount the carrier members to the support for movement of one of the pivot axes toward and away from the other pivot axis in a direction which is parallel to the disc plane of rotation when the support is in its operating position.

10. A suspension according to claim 9 wherein the means mounting the carrier members are disposed so that, when the support is in its operating position, the direction of movement of the carrier member pivot axes is aligned essentially radially of the turntable axis.

11. A suspension according to claim 10 wherein the support is fixed relative to the turntable axis.

12. A suspension according to claim 11 wherein the carrier members are mounted for movement of both pivot axes parallel to the turntable plane of rotation in a direction radially of the turntable axis.

13. A suspension according to claim 1 wherein the support includes a pair of elongate parallel rails, and the means mounting the carrier members includes coaxially aligned pairs of rollers engaged with the rails and rotatably coupled to the carrier members for mounting the carrier members between the rails for rolling movement of the carrier members along the rails.

14. A suspension according to claim 1 including means selectively operable for moving a held cartridge relative to the support away from the disc plan of rotation.

15. A suspension according to claim 1 wherein the flexible strap means comprises a strip of thin flexible material arranged in a configuration resembling a FIG. "8" having three, rather than two lobes, in end-to-end relation and in which the connection between each two adjacent lobes is defined by the passage of the strip through an opening in the strip.

16. A suspension according to claim 15 in which the strip has opposite ends which are effectively connected to each other, the strip between said ends being free of any twists of the strip about its elongate extent.

17. A suspension according to claim 15 wherein the central one of the three lobes is disposed in snug encircling relation about a phonograph transducer cartridge, and each of the other lobes is disposed in snug encircling relation about the portion of a respective carrier member which defines the cylindrical surface thereof.

18. A suspension for mounting a phonograph transducer cartridge, having extending therefrom a stylus carrier carrying a stylus engageable in the groove of a phonograph record disc, for only translatory movement of the cartridge in a direction normal to the plane of rotation of the disc in response to displacing loads applied to the stylus by the disc in response to rotation of the disc in said plane, the suspension comprising (1) a support positionable in an operating position above the disc plane of rotation proximately above the operative position of the disc,
(2) a pair of carrier members disposed on opposite sides of the position of a cartridge in the suspension and cooperatively defining a pair of convexly curved cylindrical surfaces facing each other,
(3) means mounting the carrier members to the support
  (a) for rotation of each carrier member relative to the support about a respective pivot axis which is
    (i) spaced from the respective cylindrical surface in a direction away from the other carrier member,
    (ii) parallel to the respective cylindrical surface directrix and
    (iii) parallel to the disc plane of rotation in the operation position of the support, and
  (b) for movement of at least one of the pivot axes toward and away from the other pivot axis in a direction which is parallel to the disc plane of rotation when the support is in its operating position, and
(4) flexible strap means connected to the carrier members
  (a) for substantially encircling a cartridge positioned between the cylindrical surfaces,
  (b) for holding an encircled cartridge in substantially frictionless rolling contact with cylindrical surfaces, and
  (c) for constraining an encircled cartridge to move relative to the support, in response to loads applied to an encircled cartridge in a direction normal to the disc plane of rotation, without rotation along a line which is normal to said plane when the support is in its operating position, and
(5) link means coupled between the carrier members for causing both carrier members to move in synchronism in opposite directions about their respective pivot axes in response to loads.

* * * * *

UNITED STATES PATENT AND TRADEMARK OFFICE
CERTIFICATE OF CORRECTION

PATENT NO. : 4,121,836

DATED : October 24, 1978

INVENTOR(S) : Robert G. Cheeseboro

It is certified that error appears in the above-identified patent and that said Letters Patent are hereby corrected as shown below:

Col. 4, lines 25,26, "radialtracking" should read --radial-tracking--.

Col. 8, line 4, after "above", read --and--.

Col. 11, line 21, for "member" read --number--; line 36, delete "buttons--; line 42, for "adusted" read --adjusted--.

Col. 12, line 13, after "recess" read --113--; line 14, delete "133"; line 19, after "line" read --intersection of--; line 20, delete "intersection of"; line 48, "unles" should read --unless--.

Column 15, line 15, "plan" should read --plane--; line 19, "FIG." should read --figure--.

Column 16, line 29, after "with" read --the--.

In the Grant (ONLY) insert Columns 13 and 14, as part of Letters Patent 4,121,836.

Signed and Sealed this

Seventh Day of August 1979

[SEAL]

Attest:

Attesting Officer

LUTRELLE F. PARKER
Acting Commissioner of Patents and Trademarks tive to the record groove subject only to the ambiguity associated with the angular position of the record relative to the stylus.

The presently preferred stepping motor 121 is a Type SM40-3602 stepping motor manufactured by Fuji Electrochemical Co., Ltd., Tokyo, Japan. It is preferred that the stepping motor control and position circuit be defined by a Fuji Electrochemical driver module, Type SD-01. A Fuji Electrochemical Type SM40-3602 stepper motor has a single step angle of 10°, and has maximum pull-in and pull-out pulse rates of 340 and 510 pulses per second, respectively.

Cartridge 67 is made accessible within record player 10 for various purposes, including changing stylus 72 as it becomes worn. To provide such access to the cartridge and the stylus, the cartridge support rail assembly is mounted to be rotated to provide access to the stylus, for example, but in such a manner as not to interfere with the cooperation between the cartridge and the cartridge positioning and position sensing mechanism. Accordingly, rail inner end plate 73 is connected to the top frame 61 of the record player by a screw 135 (see FIG. 2) and the outer end plate 75 is connected to the frame by a screw 136 (see FIG. 3) and by a hinge pin 137. Hinge pin 137 is aligned parallel to rails 73 between the rails and follower member support rod 15. When screws 135 and 136 are removed, the entire support structure for the cartridge suspension, i.e., the rails 73 and their connecting end plates, with the cartridge and its suspension, may be moved into a more accessible position by rotation of outer end plate 75 about hinge pin 137 having an axis which passes through substantially the center of the cartridge position sensing mechanism. Thus, the cartridge can be moved for service or access out of its normal operating position in the record player without damaging the signal generating mechanism associated with the follower member 70.

It will be appreciated that the foregoing description has been presented with reference to a presently preferred embodiment of this invention and to certain selected alternative embodiments of certain aspects of this invention. The preceding descriptions have been set forth by way of example, not as an exhaustive treatise or catalog of all forms which this invention may take. Accordingly, workers skilled in the art or arts to which this invention pertains will readily recognize that alterations, variations or modifications on the structures, arrangements and systems described above may be made without departing from the scope of this invention, and that the following claims are not to be interpreted as pertaining only to the specific arrangements, structures and procedures described above.

What is claimed is:

1. A suspension for mounting a phonograph transducer cartridge, having a stylus engageable in the groove of a phonograph record disc, the suspension comprising
   (1) a support positionable in an operating position above a plane of rotation of the disc proximately above the operating position of the plane,
   (2) a pair of carrier members disposed on opposite sides of the position of a cartridge in the suspension and cooperatively defining a pair of parallel convexly curved cylindrical surfaces facing each other,
   (3) means mounting the carrier members to the support for rotation of each carrier member relative to the support about a respective pivot axis which is
   (a) spaced from the respective cylindrical surface in a direction away from the other carrier member,
   (b) parallel to the respective cylindrical surface directrix, and
   (c) parallel to the disc plane of rotation in the operating position of the support,
   (4) flexible strap means connected to the carrier members
   (a) for holding a cartridge between the cylindrical surfaces in substantially frictionless rolling contact with the cylindrical surfaces, and
   (b) for constraining a held cartridge to move relative to the support, in response to loads applied to a held cartridge in a direction normal to the disc plane of rotation, without rotation along a line which is normal to said plane when the support is in its operating position, and
   (5) link means coupled between the carrier members for causing both carrier members to move in synchronism in opposite directions about their respective pivot axes in response to said loads.

2. A suspension according to claim 1 wherein the flexible strap means is arranged for substantially encircling a cartridge positioned between the cylindrical surfaces.

3. A suspension according to claim 2 including counterbalance means coupled to one of the carrier members for controlling the force of engagement between a stylus carried by an encircled cartridge and a record disc disposed in the plane of rotation.

4. A suspension according to claim 2 wherein an encircled cartridge has a stylus carrier which extends from the cartridge only along the line of movement of the cartridge relative to the support.

5. A suspension according to claim 4 wherein the stylus is connected to the end of the stylus carrier for loading the carrier principally only axially in response to engagement of the stylus with a record disc.

6. A suspension according to claim 1 wherein the disc plane of rotation is defined by a turntable rotatable about an axis of rotation, and including means mounting the support relative to the turntable so that, when the support is in its operating position, the support is substantially more resistant to movement toward and away from the turntable than is the cartridge.

7. A suspension according to claim 6 wherein the support mounting means is arranged for movement between the operating position thereof and a retracted position in which the support is displaced laterally from the operating position in a direction away from the turntable axis.

8. A suspension according to claim 7 including means for fixing the support in its operating position.

9. A suspension according to claim 6 wherein the carrier member mounting means mount the carrier members to the support for movement of one of the pivot axes toward and away from the other pivot axis in a direction which is parallel to the disc plane of rotation when the support is in its operating position.

10. A suspension according to claim 9 wherein the means mounting the carrier members are disposed so that, when the support is in its operating position, the direction of movement of the carrier member pivot axes is aligned essentially radially of the turntable axis.

11. A suspension according to claim 10 wherein the support is fixed relative to the turntable axis.